(12) United States Patent
Fiolka

(10) Patent No.: US 12,366,740 B2
(45) Date of Patent: Jul. 22, 2025

(54) SYSTEMS AND METHODS FOR LIVE PROJECTION IMAGING FOR FLUORESCENCE MICROSCOPY

(71) Applicant: The Board of Regents of The University of Texas System, Austin, TX (US)

(72) Inventor: Reto Fiolka, Dallas, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 86 days.

(21) Appl. No.: 18/019,049

(22) PCT Filed: Aug. 2, 2021

(86) PCT No.: PCT/US2021/044193
§ 371 (c)(1),
(2) Date: Jan. 31, 2023

(87) PCT Pub. No.: WO2022/026952
PCT Pub. Date: Feb. 3, 2022

(65) Prior Publication Data
US 2023/0314787 A1    Oct. 5, 2023

Related U.S. Application Data

(60) Provisional application No. 63/063,779, filed on Aug. 10, 2020, provisional application No. 63/059,554, filed on Jul. 31, 2020.

(51) Int. Cl.
*G02B 21/36* (2006.01)
*G01N 21/64* (2006.01)
(Continued)

(52) U.S. Cl.
CPC ....... *G02B 21/364* (2013.01); *G01N 21/6458* (2013.01); *G02B 21/0048* (2013.01);
(Continued)

(58) Field of Classification Search
CPC .............. G02B 21/364; G02B 21/0048; G02B 21/0076; G02B 1/16; G02B 21/002;
(Continued)

(56) References Cited

U.S. PATENT DOCUMENTS 3,548,730 A    12/1970   Verge
5,999,306 A *  12/1999   Atobe ................ G02B 26/0841
                                                          359/224.1
(Continued)

FOREIGN PATENT DOCUMENTS

WO    2020/058556 A1    3/2020

OTHER PUBLICATIONS

International Search Report and Written Opinion for International application No. PCT/US2021/044193, mailed Nov. 18, 2021, 9 pages.
(Continued)

*Primary Examiner* — Timothy R Newlin
(74) *Attorney, Agent, or Firm* — NORTON ROSE FULBRIGHT US LLP

(57) ABSTRACT

Implementations discussed and claimed herein provide systems and methods live projection imaging for fluorescence microscopy. In one implementation, a 3D view of a sample, such as cells, is generated for direct viewing. A projection of a volume is generated that is optically sheared into a single camera frame in light-sheet fluorescence microscopy. Optical shearing is synchronized with acquisition of a volume, where volumetric information may be directly viewed in a single acquisition to evaluate cellular 3D morphologies and dynamics.

20 Claims, 10 Drawing Sheets

(51) Int. Cl.
*G02B 21/00* (2006.01)
*G02B 1/16* (2015.01)

(52) U.S. Cl.
CPC . *G02B 21/0076* (2013.01); *G01N 2201/0636* (2013.01); *G01N 2201/105* (2013.01); *G02B 1/16* (2015.01)

(58) Field of Classification Search
CPC ............... G02B 21/06; G01N 21/6458; G01N 2201/0636; G01N 2201/105
See application file for complete search history.

(56) References Cited

U.S. PATENT DOCUMENTS

| | | | | |
|---|---|---|---|---|
| 6,404,545 | B1* | 6/2002 | Ishiwata | G02B 21/0056 359/371 |
| 2004/0073119 | A1* | 4/2004 | Mycek | G01N 21/6408 600/476 |
| 2006/0108525 | A1* | 5/2006 | Nakagaki | H01J 37/28 250/310 |
| 2009/0174935 | A1* | 7/2009 | Szulczewski | G02B 21/0048 359/368 |
| 2009/0225411 | A1* | 9/2009 | Cui | G02B 21/0024 359/385 |
| 2011/0115895 | A1 | 5/2011 | Huisken | |
| 2013/0335818 | A1 | 12/2013 | Knebel et al. | |
| 2016/0214107 | A1* | 7/2016 | Viasnoff | G02B 21/02 |
| 2016/0268098 | A1* | 9/2016 | Choi | H01J 37/265 |
| 2018/0045941 | A1* | 2/2018 | Gao | G01N 15/1456 |
| 2018/0088308 | A1* | 3/2018 | Liu | G02B 21/367 |
| 2018/0292321 | A1 | 10/2018 | Fiolka et al. | |
| 2019/0170646 | A1 | 6/2019 | Fiolka | |
| 2019/0196172 | A1 | 6/2019 | Hillman | |
| 2019/0324244 | A1* | 10/2019 | Kozorovitskiy | G02B 21/367 |
| 2020/0201018 | A1 | 6/2020 | Vaziri et al. | |
| 2021/0100450 | A1* | 4/2021 | Amma | A61B 3/0025 |
| 2022/0043251 | A1* | 2/2022 | Moore | G06T 5/60 |
| 2022/0103774 | A1* | 3/2022 | Liang | G03B 39/00 |

OTHER PUBLICATIONS

Fu, Q., et al. "Imaging multicellular specimens with real-time optimized tiling light-sheet selective plane illumination microscopy." Nature communications 7.1 (2016): 11088.
Lacroute, P., et al. "Fast volume rendering using a shear-warp factorization of the viewing transformation." Proceedings of the 21st annual conference on Computer graphics and interactive techniques. 1994.
Ji, N. "Adaptive optical fluorescence microscopy." Nature methods 14.4 (2017): 374-380.
Holden, S., et al. "DAOSTORM: an algorithm for high-density super-resolution microscopy." Nature methods 8.4 (2011): 279-280.
Liu, Z., et al. Imaging live-cell dynamics and structure at the single-molecule level. Mol. Cell 58, 644-659 (2015).
Stelzer, E., et al. Light sheet fluorescence microscopy. Nat. Rev. Methods Prim. 1, 73 (2021).
Reynaud, E., et al. Light sheet-based fluorescence microscopy: more dimensions, more photons, and less photodamage. HFSP J. 2, 266-275 (2010).
Olarte, O., et al. Light-sheet microscopy: a tutorial. Adv. Opt. Photonics 10, 111-179 (2018).
Stelzer, E. Light-sheet fluorescence microscopy for quantitative biology. Nat. Methods 12, 23-26 (2014).
Hu, Y., et al. Single-molecule super-resolution light-sheet microscopy. ChemPhysChem. 15, 577-586 (2014).
Betzig, E., et al. Imaging intracellular fluorescent proteins at nanometer resolution. Science 313, 1642-1645 (2006).
Rust, M., et al. Sub-diffraction-limit imaging by stochastic optical reconstruction microscopy (STORM). Nat. Methods 3, 793-796 (2006).

Cella Zanacchi, F., et al. Live-cell 3D super-resolution imaging in thick biological samples. Nat. Methods 8, 1047-1049 (2011).
Galland, R., et al. 3D high- and super-resolution imaging using single-objective SPIM. Nat. Methods 12, 641-644 (2015).
Meddens, M., et al. Single objective light-sheet microscopy for high-speed whole-cell 3D super-resolution. Biomed. Opt. Express 7, 2219-2236 (2016).
Wäldchen, F., et al. Whole-cell imaging of plasma membrane receptors by 3D lattice light-sheet dSTORM. Nat. Commun. 11, 887 (2020).
Kim, J., et al. Oblique-plane single-molecule localization microscopy for tissues and small intact animals. Nat. Methods 16, 853-857 (2019).
Zhao, Z., et al. Spatial organization of RNA polymerase II inside a mammalian cell nucleus revealed by reflected light-sheet super-resolution microscopy. Proc. Natl Acad. Sci. USA 111, 681-686 (2013).
Gebhardt, J., et al. Single-molecule imaging of transcription factor binding to DNA in live mammalian cells. Nat. Methods 10, 421-426 (2013).
Greiss, F., et al. Single-molecule imaging in living *Drosophila* embryos with reflected light-sheet microscopy. Biophys. J. 110, 939-946 (2016).
Zagato, E., et al. Microfabricated devices for single objective single plane illumination microscopy (SoSPIM). Opt. Express 25, 1732-1745 (2017).
Legant, W., et al. High-density three-dimensional localization microscopy across large volumes. Nat. Methods 13, 359-365 (2016).
Hell, S., et al. Breaking the diffraction resolution limit by stimulated emission: stimulated-emission-depletion fluorescence microscopy. Opt. Lett. 19, 780-782 (1994).
Friedrich, M., et al. STED-SPIM: stimulated emission depletion improves sheet illumination microscopy resolution. Biophys. J. 100, L43-L45 (2011).
Scheul, T., et al. STED-SPIM made simple. Opt. Express 22, 30852-30864 (2014).
Hoyer, P., et al. Breaking the diffraction limit of light-sheet fluorescence microscopy by RESOLFT. Proc. Natl Acad. Sci. USA 113, 3442-3446 (2016).
Gustafsson, M. Surpassing the lateral resolution limit by a factor of two using structured illumination microscopy. J. Microsc. 198, 82-87 (2000).
Heintzmann, R., et al. Laterally modulated excitation microscopy: improvement of resolution by using a diffraction grating. SPIE Proc. https://doi.org/10.1117/12.336833 (1999).
Chen, B.-C., et al. Lattice light-sheet microscopy: imaging molecules to embryos at high spatiotemporal resolution. Science 346, 1257998 (2014).
Chang, B.-J., et al. csiLSFM combines light-sheet fluorescence microscopy and coherent structured illumination for a lateral resolution below 100 nm. Proc. Natl Acad. Sci. USA 114, 4869-4874 (2017).
Dunsby, C. Optically sectioned imaging by oblique plane microscopy. Opt. Express 16, 20306-20316 (2008).
Sapoznik, E., et al. A versatile oblique plane microscope for large-scale and high-resolution imaging of subcellular dynamics. eLife 9, e57681 (2020).
Yang, B., et al. DaXi—high-resolution, large imaging volume and multi-view single-objective light-sheet microscopy. Nat. Methods 19, 461-469 (2022).
Fenix, A., et al. Muscle-specific stress fibers give rise to sarcomeres in cardiomyocytes. eLife 7, e42144 (2018).
Descloux, A., et al. Parameter-free image resolution estimation based on decorrelation analysis. Nat. Methods 16, 918-924 (2019).
Stoldt, S., et al. Mic60 exhibits a coordinated clustered distribution along and across yeast and mammalian mitochondria. Proc. Natl Acad. Sci. USA 116, 9853-9858 (2019).
Baron, W., et al. On the biogenesis of myelin membranes: sorting, trafficking and cell polarity. FEBS Lett. 584, 1760-1770 (2010).
Mino, R., et al. An internally eGFP-tagged α-adaptin is a fully functional and improved fiduciary marker for clathrin-coated pit dynamics. Traffic 21, 603-616 (2020).

(56) References Cited

OTHER PUBLICATIONS

Mettlen, M., et al. Imaging and modeling the dynamics of clathrin-mediated endocytosis. Cold Spring Harb. Perspect. Biol. 6, a017038-a017038 (2014).
Aguet, F., et al. Advances in analysis of low signal-to-noise images link dynamin and AP2 to the functions of an endocytic checkpoint. Dev. Cell 26, 279-291 (2013).
Chakraborty, T., et al. Light-sheet microscopy of cleared tissues with isotropic, subcellular resolution. Nat. Methods 16, 1109-1113 (2019).
Dean, K., et al. Deconvolution-free subcellular imaging with axially swept light sheet microscopy. Biophys. J. 108, 2807-2815 (2015).
Yeh, L.-H., et al. Structured illumination microscopy with unknown patterns and a statistical prior. Biomed. Opt. Express 8, 695-711 (2017).
Cai, M., et al. Total variation and spatial iteration-based 3D structured illumination microscopy. Opt. Express 30, 7938-7953 (2022).
Lai-Tim, Y. et al. Jointly super-resolved and optically sectioned Bayesian reconstruction method for structured illumination microscopy. Opt. Express 27, 33251-33267 (2019).
Jin, L. et al. Deep learning enables structured illumination microscopy with low light levels and enhanced speed. Nat. Commun. 11, 1934 (2020).
Kumar, M., et al. Integrated one- and two-photon scanned oblique plane illumination (SOPi) microscopy for rapid volumetric imaging. Opt. Express 26, 13027-13041 (2018).
Chang, B.-J., et al. Real-time multi-angle projection imaging of biological dynamics. Nat. Methods 18, 829-834 (2021).
Abrisch, R., et al. Fission and fusion machineries converge at ER contact sites to regulate mitochondrial morphology. J. Cell Biol. 219, e201911122 (2020).
Bodbin, S., et al. Transfection of hPSC-cardiomyocytes using Viafect™ transfection reagent. Methods Protoc. 3, 57 (2020).
Brown, P., et al. Multicolor structured illumination microscopy and quantitative control of polychromatic light with a digital micromirror device. Biomed. Opt. Express 12, 3700-3716 (2021).
Lal, A., et al. Structured illumination microscopy image reconstruction algorithm. IEEE J. Sel. Top. Quantum Electron. 22, 50-63 (2016).
Müller, M., et al. Open-source image reconstruction of super-resolution structured illumination microscopy data in ImageJ. Nat. Commun. 7, 10980 (2016).
Wicker, K., et al. Phase optimisation for structured illumination microscopy. Opt. Express 21, 2032-2049 (2013).
Neil, M., et al. Real time 3D fluorescence microscopy by two beam interference illumination. Opt. Commun. https://doi.org/10.1016/S0030-4018(98)00210-7 (1998).
O'Holleran, K., et al. Optimized approaches for optical sectioning and resolution enhancement in 2D structured illumination microscopy. Biomed. Opt. Express 5, 2580-2590 (2014).
Shaw, M., et al. High speed structured illumination microscopy in optically thick samples. Methods 88, 11-19 (2015).
Demmerle, J., et al. Strategic and practical guidelines for successful structured illumination microscopy. Nat. Protoc. 12, 988-1010 (2017).
Smith, C., et al. Structured illumination microscopy with noise-controlled image reconstructions. Nat. Methods 18, 821-828 (2021).
Perez, V., et al. Optimal 2D-SIM reconstruction by two filtering steps with Richardson-Lucy deconvolution. Sci. Rep. 6, 37149 (2016).

\* cited by examiner

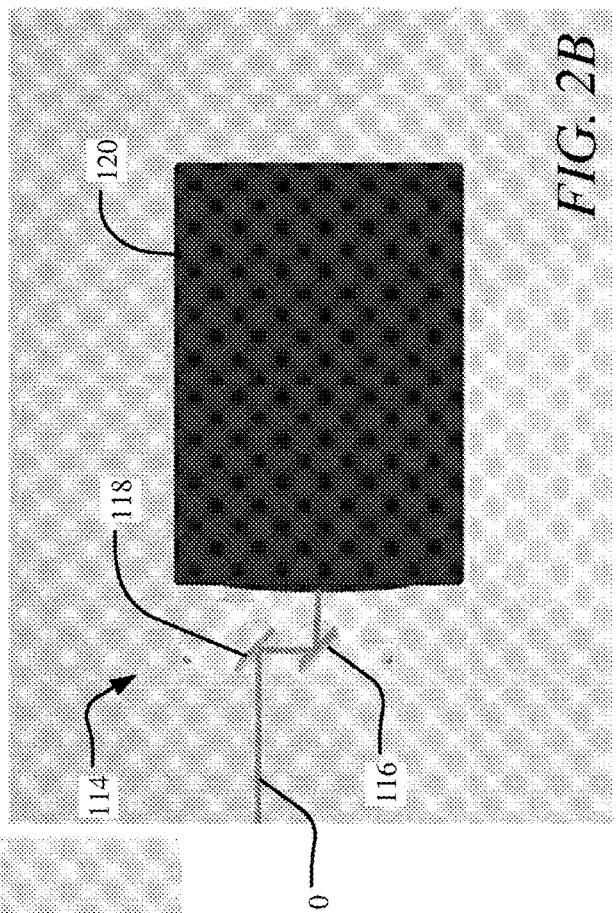
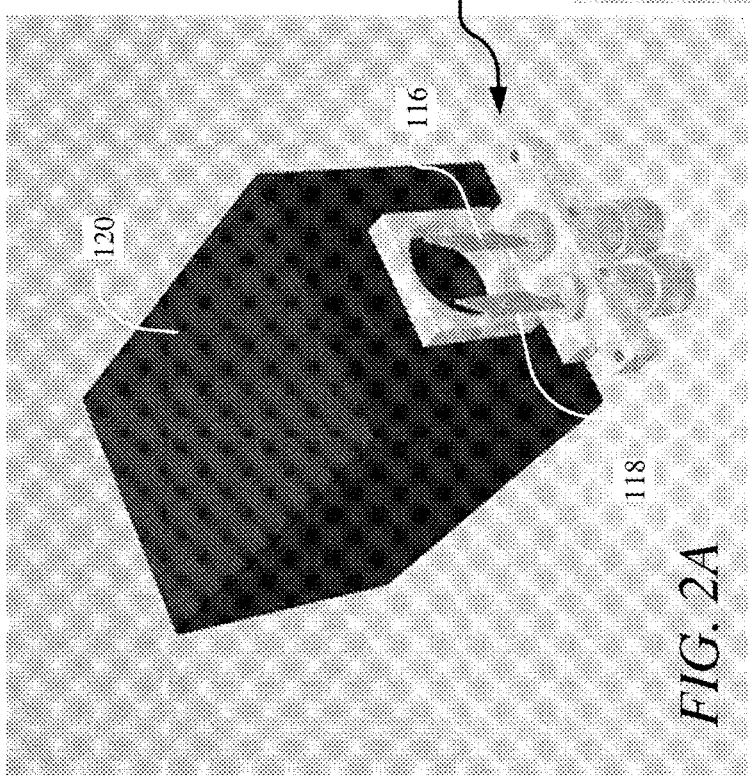
FIG. 2A
FIG. 2B

SYSTEMS AND METHODS FOR LIVE PROJECTION IMAGING FOR FLUORESCENCE MICROSCOPY

CROSS-REFERENCE TO RELATED APPLICATIONS

This application is a national stage application filed under 35 U.S.C. § 371 of International Patent Application No. PCT/US2021/044193 entitled "SYSTEMS AND METHODS FOR LIVE PROJECTION IMAGING FOR FLUORESCENCE MICROSCOPY" and filed Aug. 2, 2021, which claims priority to U.S. Provisional Patent Applications Nos. 63/063,779, filed on Aug. 10, 2020 and 63/059,554, filed on Jul. 31, 2020, both entitled "SYSTEMS AND METHODS FOR LIVE PROJECTION IMAGING FOR FLUORESCENCE MICROSCOPY." Each of these applications is specifically incorporated by reference in its entirety herein.

ACKNOWLEDGEMENT OF GOVERNMENT SUPPORT

This invention was made with government support under Grant Number GM133522 awarded by the National Institutes of Health, and Grant Number RR160057 awarded by the Cancer Prevention Institute of Texas. The government has certain rights in the invention.

BACKGROUND

1. Field

The present disclosure is directed to systems and methods for directly viewing a volume and more particularly to generating a projection of a three-dimensional (3D) volume in real time for fluorescence microscopy.

2. Discussion of Related Art

To understand a sample of a specimen, ranging from inanimate viruses to complex multicellular organisms, various optical techniques are used to provide non-invasive, low phototoxicity, and high resolution volumetric imaging. For example, 3D fluorescence microscopy typically involves a serial acquisition of two-dimensional (2D) images from which a 3D volume is rendered to view individual cells or aspects of the specimen. Stated differently, to make sense of 3D data for a specimen, a 3D stack including hundreds of 2D images is acquired, and a 3D image of the specimen is rendered using a graphics program. Not only is this process time intensive and computationally burdensome, but capturing images of and understanding fast biological or other dynamic processes associated with the specimen is challenging using this process. More particularly, because this process is typically not performed in real-time, it remains challenging to identify cells of interest, as well as to optimize image acquisition parameters (e.g., illumination properties, alignment, scan range, etc.). Furthermore, it limits the volumetric image acquisition rate, adds substantial computational overhead, results in duplicated data, and ultimately diminishes the throughput of a microscope generally used in connection with this process. It is with these observations in mind, among others, that various aspects of the present disclosure were conceived and developed.

BRIEF DESCRIPTION OF THE DRAWINGS

To describe the manner in which the advantages and features of the disclosure can be obtained, reference is made to implementations thereof which are illustrated in the appended drawings. One of skill in the art will understand that the reference numbers in the following figures are repeated throughout FIGS. 1-10 so as to refer to the same or substantially the same features. Understanding that these drawings depict only exemplary implementations of the disclosure and are not therefore to be considered to be limiting of its scope, the principles herein are described and explained with additional specificity and detail through the use of the accompanying drawings.

FIGS. 2A-2B are a perspective view and a top view, respectively, of an example galvanometric shearing unit attached to a camera.

DETAILED DESCRIPTION

It will be appreciated that numerous specific details are set forth in order to provide a thorough understanding of the implementations described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the implementations described herein.

Aspects of the present disclosure generally involve systems and methods for generating a 3D view of a sample, such as cells, for direct viewing. In one aspect, a direct, 3D view of a volume is provided using sensitive microscopy, such as lattice light-sheet microscopy (LLSM), oblique plane microscopy (OPM), or other light-sheet fluorescence microscopy (LSFM). As opposed to acquiring a 3D stack comprising sometimes hundreds of 2D images for rendering in a graphics program, the presently disclosed technology renders a 3D volume optically and in real-time (i.e., instantaneously or near instantaneously). More particularly, in one aspect, the presently disclosed technology generates a projection of a volume that is optically sheared into a single camera frame in light-sheet fluorescence microscopy, such as LLSM, OPM, and/or the like. Optical shearing is synchronized with acquisition of a volume, where volumetric information may be directly viewed in a single acquisition to evaluate cellular 3D morphologies and dynamics. Overall, the presently disclosed technology provides ultrafast imaging of volumes, thereby facilitating capture of fast biological processes, reducing computational burden of image acquisition, increasing microscopy throughput, and simplifying navigation and evaluation of a 3D sample, among other advantages.

Overall, the various systems and methods of the presently disclosed technology provide a shearing unit deployed in an optical system that displaces images on a camera to generate an effect of a projection under different viewing angles. Example implementations discussed herein involve LLSM, OPM, and similar light-sheet microscopy. However, it will be appreciated by those skilled in the art that the presently disclosed technology is applicable to any microscope forming an image on a camera and permitting rapid change of the focal plane being viewed. As one example, the systems and methods described herein may be applicable to spinning disk microscopy. However, other classes of microscopes are contemplated as well. Independent of the class of microscopy, by using the shearing unit of the presently disclosed technology, a real-time projection of a 3D sample is formed, and the viewing angle of the projection is adjustable by changing an amount of shearing.

Figure 1:
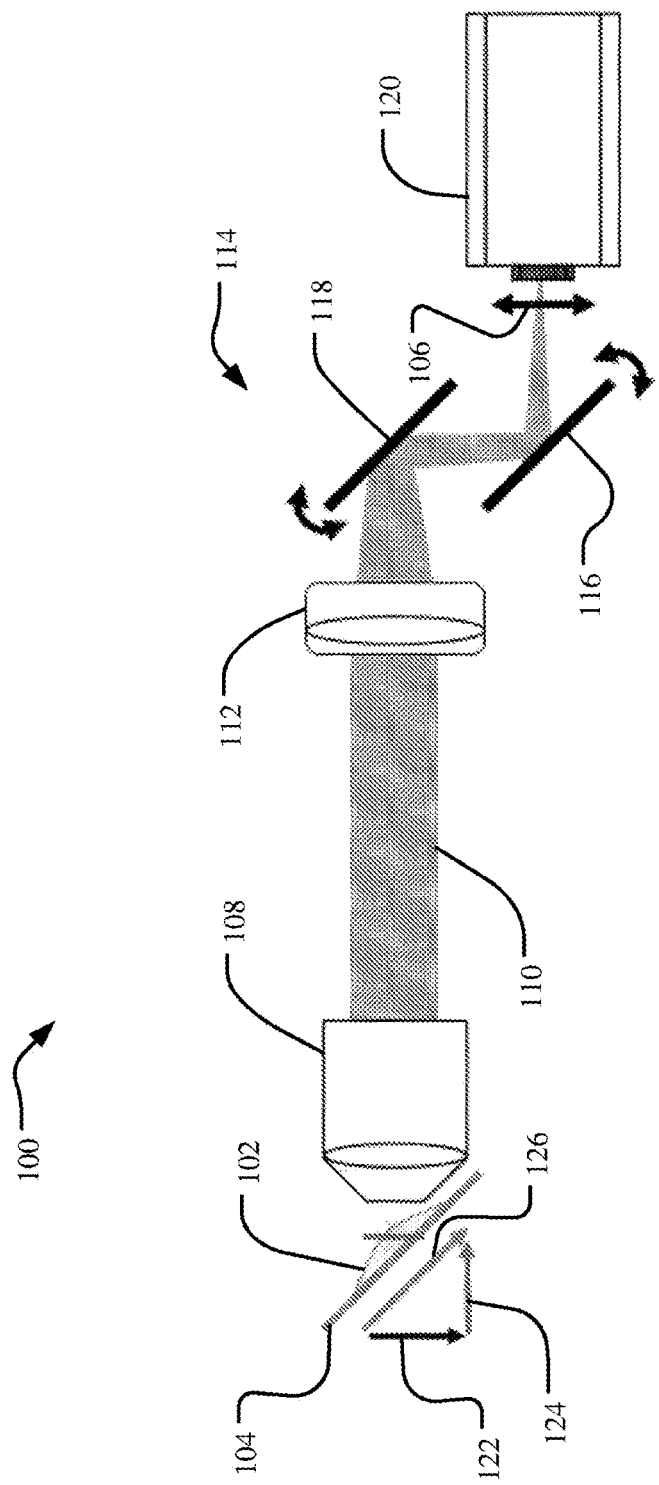
FIG. 1 is a diagram showing an example system for live projection imaging using lattice light-sheet microscopy or oblique plane microscopy.

To begin a detailed description of an example system 100 for live projection imaging, reference is made to FIG. 1. In one implementation, the system 100 utilizes LSFM techniques. The highest performance subcellular LSFM techniques, including OPM and LLSM, image adherent cells that are oriented diagonally to the illumination and detection axes of the system 100, such that a sample 102 is scanned in a diagonal direction relative to a direction of illumination propagation and a direction of fluorescence detection. Generally, LSFM techniques utilize short, thin light-sheets, thereby providing improved z-resolution and reduced coverslip induced aberrations. However, as described herein, LSFM techniques often involve the acquisition of hundreds of image planes per cell, all of which being computationally sheared to permit visualization and quantification. Conversely, in one implementation, the system 100 performs shearing optically as opposed to computationally. The system 100 projects a sheared volume onto a single camera frame, permitting a 3D rendering of the sample 102 to be viewed in real-time prior to volumetric imaging. Alternatively or additionally, the system 100 permits rapid cellular process of the sample 102 to be volumetrically imaged in a 2D projection format with uncompromised lateral resolution.

In one implementation, the sample 102 is disposed on a coverslip 104 relative to an objective 108. The system 100 scans the sample 102, and a path of fluorescence light 108 is directed through a lens 110 (e.g., a tube lens) into an imager, such as a camera 120. The camera 120 may be a sCMOS, CCD, and/or similar camera or imager. Further, it will be appreciated that various types of imagers may be used. In alternative or addition to the camera 120, an eyepiece may be used, as described herein, for viewing the sample 102 with the naked eye.

As can be understood from FIGS. 1-2B, in one implementation, a shearing unit 114 is disposed in front of the camera 120. For example, the shearing unit 114 may attach to a c-mount of a scientific camera. The shearing unit 114 may include a first mirror 116 and a second mirror 118. The mirrors 116-118 may be galvanometric mirrors coated with gold or similar material, such that the shearing unit 114 is a modular galvanometer-based scan unit that attaches to the camera 120 to perform shearing synchronously with acquisition of a z-stack. As the sample 102 is scanned, the fluorescence light 108 is swept across the camera 120, permitting volumetric information of the sample 102 to be analyzed and viewed directly in a single acquisition. Thus, the speed at which the volumetric information is obtained is tied to the frame rate of the camera 120, increasing acquisition speed over conventional systems by 200 times or more. While the shearing unit 114 is described as including a set of galvanometric mirrors in this example, it will be appreciated by those skilled in the art that translation of the images may be performed by a variety of mechanisms. For example, the shearing unit 114 may include one galvanometric mirror and two scan lenses, and/or the like.

The system 100 scans the sample 102 along a scanning direction 126. In the example shown in FIG. 1, the scanning direction 126 is diagonal compared a detection direction 122 and an illumination direction 124. The system 100 scans the sample 102 oriented on the coverslip 104 along the scanning direction 126 while illuminating the sample 102 with a light-sheet generated by at least one light source along the illumination direction 124. In one implementation, when the sample 102 is scanned, the mirrors 116 and 118 are rotated in synchrony. The synchronized rotation of the mirrors 116-118 of the shearing unit 114 displaces the image created from the fluorescence light 108 across the camera 120 in a displacement direction 106. In one implementation, the displacement direction 106 is lateral, such that the image is displaced laterally across the camera 120.

Figure 4A:
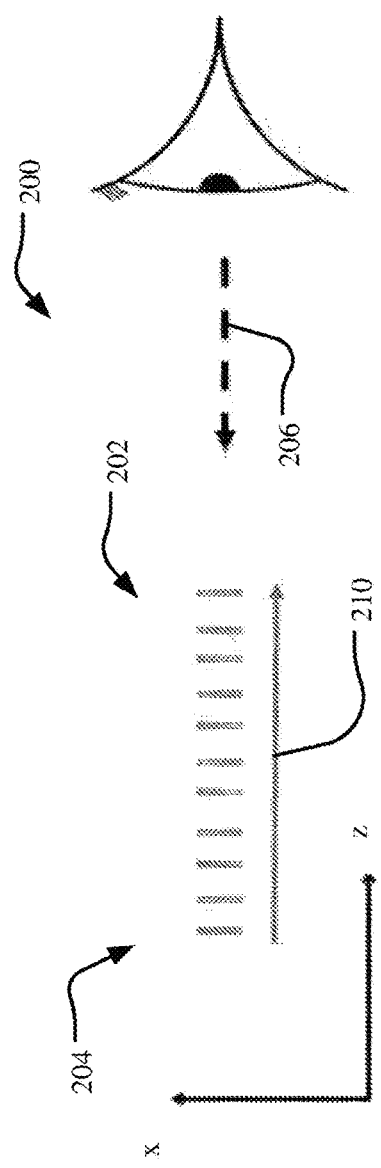
FIGS. 4A and 4B illustrate projection of an image, without and with using a lateral shearing unit, respectively.

Referring to FIG. 4A, in the absence of the shearing unit 114, the sample 102 is scanned along the scanning direction 126 on a diagonal trajectory relative to the detection direction 122, while being illuminated with a light-sheet in the illumination direction 124. As shown in FIG. 4A, the images 202-204 (images 1 . . . n) acquired are sequentially stacked in a stacking direction 210 in the z-dimension to form a 3D stack. The 3D stack does not reflect the x-component of the scan trajectory along the scanning direction 126, only the axial-component along the illumination direction 124. As such, if the 3D stack is viewed along a viewing direction 206 as a projection 200, the 3D stack will appear distorted.

Figure 4B:
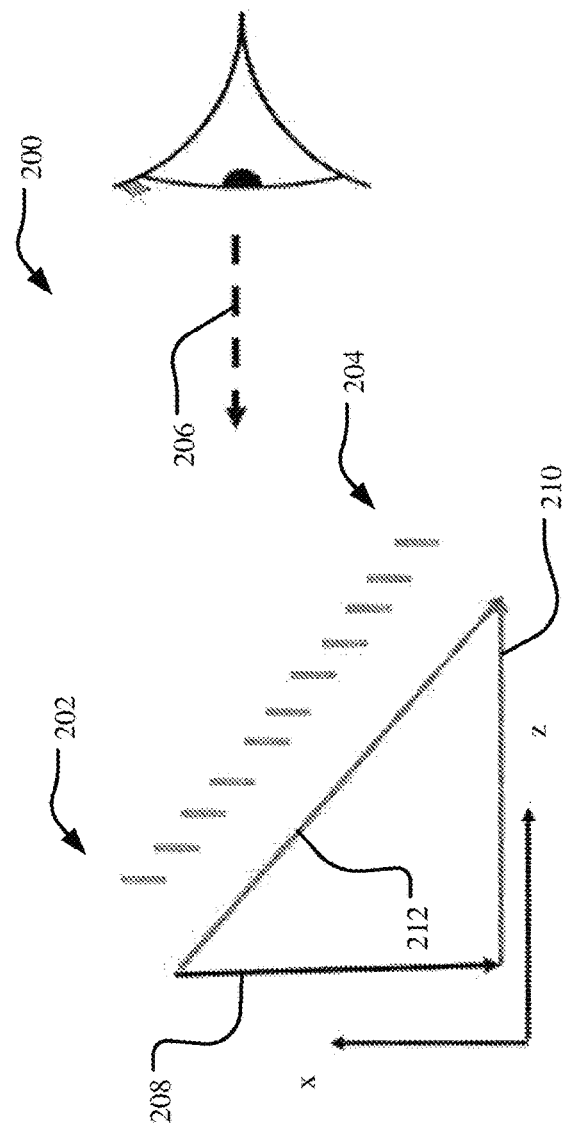

Referring to FIG. 4B, when the sample 102 is scanned, the shearing unit 114 causes the image to be displaced laterally on the camera 120, as described herein. The images 202204 acquired are stacked in the stacking direction 210 in the z-dimension and laterally shifted in a shearing direction 208 along the x-dimension. Thus, the images 202-204 are stacked according to the natural positions of the sections of the sample 102 along the scanning direction 126 in sample space and in image space. With the images 202-204 being located in the corresponding natural positions, the projection 200 viewed along the viewing direction 206 will appear distortion free.

Independent of whether the projection 200 appears distorted (e.g., in the example of FIG. 4A) or distortion free (e.g., in the example of FIG. 4B), the projection 200 may be computed by numerically summing all the tiles of the images 202-204 in the 3D stack together to generate a sum projection. In another implementation, a summation may be formed by scanning the sample 102 one or more times during a single exposure of the camera 120, such that the sum of all the images 202-204 directly appears on the camera 120 as the projection 200.

In some implementations, the projection 200 is formed such that it can be viewed with the naked eye using an eyepiece. More particularly, an eyepiece may be included with the system 100 in place of or in addition to the camera 120. The projection 200 is generated as detailed herein, and the eyepiece is disposed relative to an image plane of the projection 200 for direct view. In these implementations, a speed at which the sample 102 is scanned and a shearing speed of the shearing unit 114 are optimized to correspond to physiological limitations of the human eye. For example, the system 100 may scan the sample 102 faster than or equivalent to a video rate.

Figure 3:
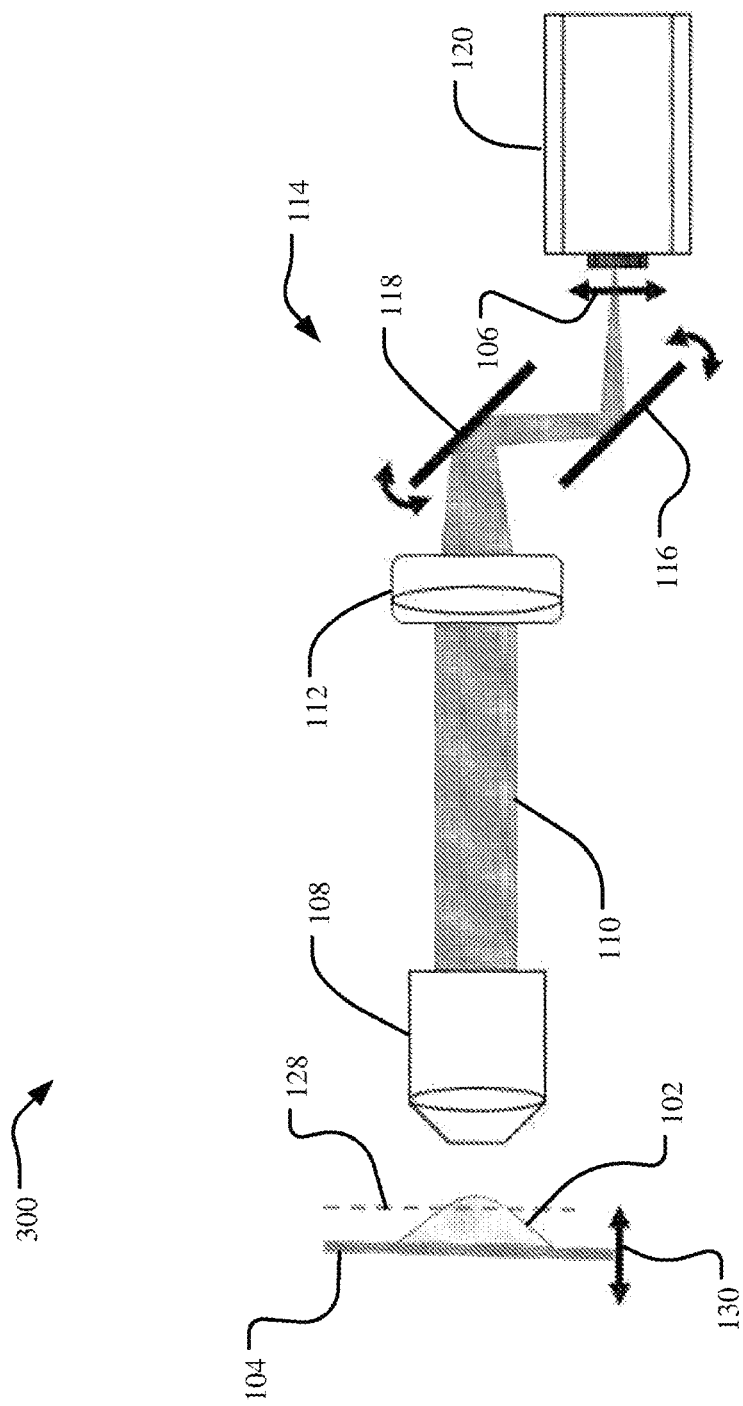
FIG. 3 depicts an example system for live projection imaging using epifluorescence microscopy.

Referring to FIGS. 3 and 4A-4B, in one implementation, the system 100 involves epifluorescence microscopy. The sample 102 is disposed on the coverslip 104 with a focal plane 128 relative to the objective 108. In one implementation, the sample 102 or the objective 108 is scanned rapidly in a scanning direction 130 to form a 3D stack. Again, referring to FIG. 4A, in the absence of the shearing unit 114, the images 202-204 acquired are sequentially stacked in the stacking direction 210 in the z-dimension to form a 3D stack. As such, if the 3D stack is viewed in the viewing direction 206, the projection 200 will appear along the optical axis. In another implementation, referring again to FIG. 4B, when the sample 102 is scanned, the shearing unit 114 causes the image to be displaced laterally on the camera 120, as described herein. The images 202-204 acquired are stacked in the stacking direction 210 in the z-dimension and laterally shifted in the shearing direction 208 along the x-dimension. Regardless of whether the shearing unit 114 is utilized, the projection 200 may be computed by numerically summing all the tiles of the images 202-204 in the 3D stack together to generate a sum projection. In another implementation, a summation may be formed by scanning the sample 102 one or more times during a single exposure of the camera 120, such that the sum of all the images 202-204 directly appears on the camera 120 as the projection 200. When the shearing unit 114 is utilized, the projection 200 appears from a different viewing angle, permitting direct real-time views of the sample 102 that are adjustable.

Figure 5:
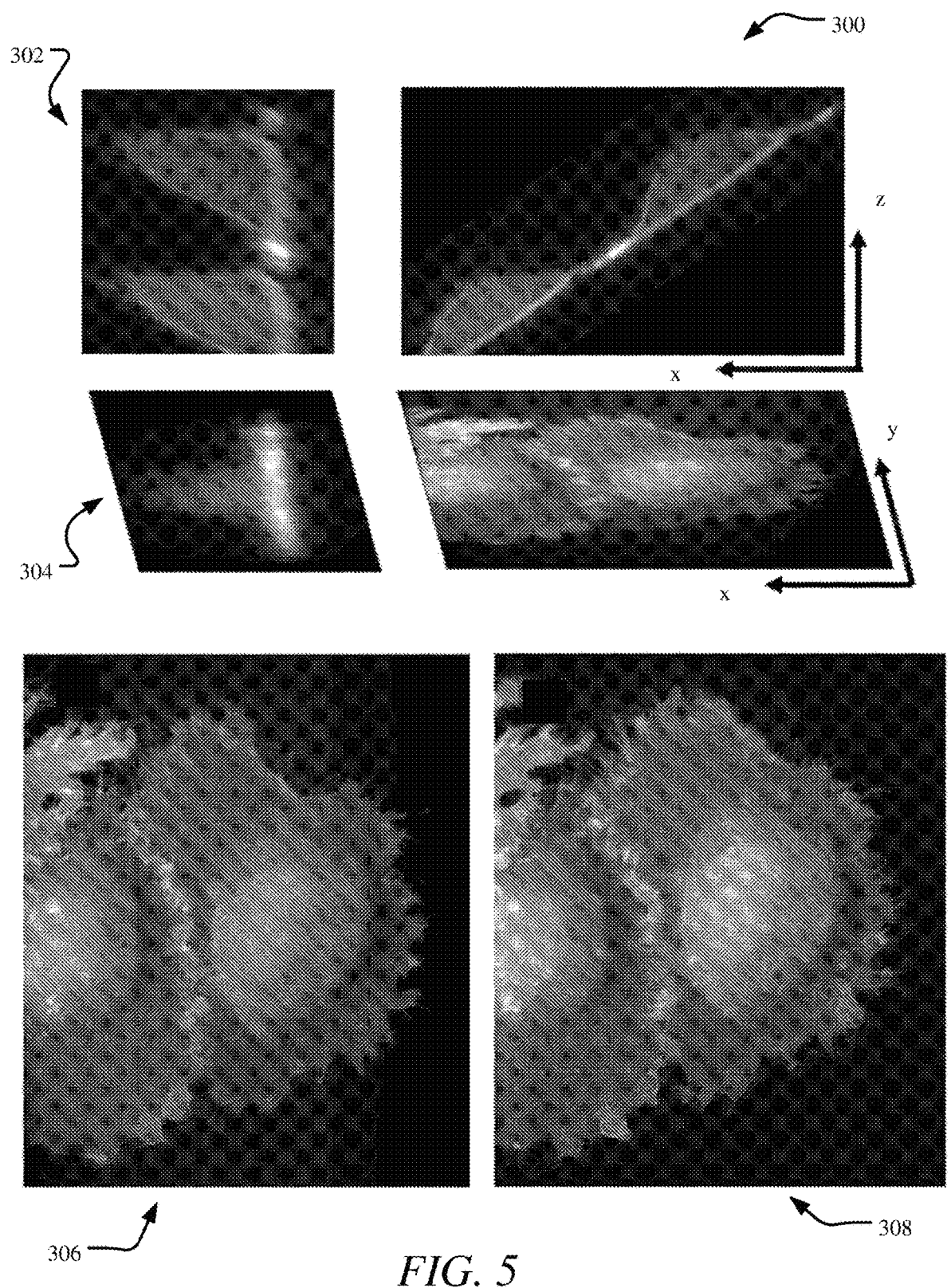
FIG. 5 shows a series of example images comparing a stacked volume and a live projection on a single camera frame.

Turning to FIG. 5, a series 300 of example images of mammalian cells comparing a stacked volume and a live projection on a single camera frame are shown. The images 302 and 304 illustrate data volumes in LLSM or OPM before and after shearing, with the images 304 showing the projection of the data. Image 306 is a projection of a z-stack formed from 334 planes. The image 306 shows MV3 cells expressing AKtPH-GFP. As such, generation of the image 306 involved the acquisition of 334 image planes per cell, with each of the image planes being computationally sheared for visualization. Stated differently, the cells were imaged, computationally sheared, and sum intensity projected to form the image 306 showing a population of MV3 cells expressing AKtPH-GFP. Conversely, image 308 is a live projection view of the same MV3 cells expressing AKtPH-GFP acquired on a single camera frame. As can be understood from FIG. 5, the image 306 and the image 308 are largely indistinguishable, despite the image 308 being acquired in a single camera frame with imaging time and computational overhead being reduced approximately hundredfold. Given that the data is sum intensity projected, information along the third axis may be sacrificed. However, unlike widefield and extended depth-of-focus microscopy, an entirety of the axial extent of the cell remains in focus, with no appreciable loss in lateral resolution and by acquiring a series of projections of varying shear amplitude, some 3D information can be encoded and potentially extracted. Further, with the light-sheet illumination, the data have high optical contrast.

Figure 6:
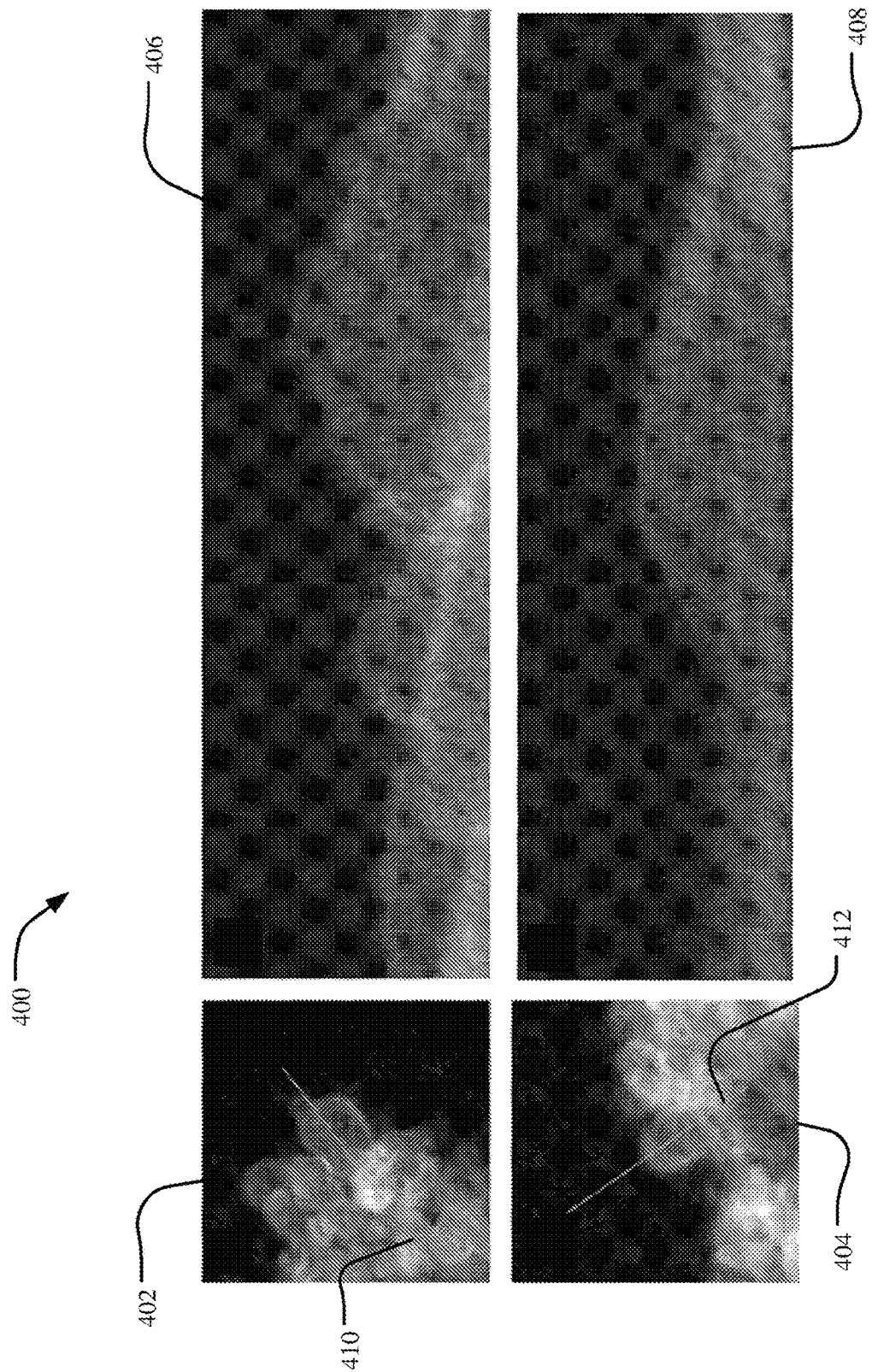
FIG. 6 illustrates blebs on an example image of a cell and associated kymographs.
Figure 7:
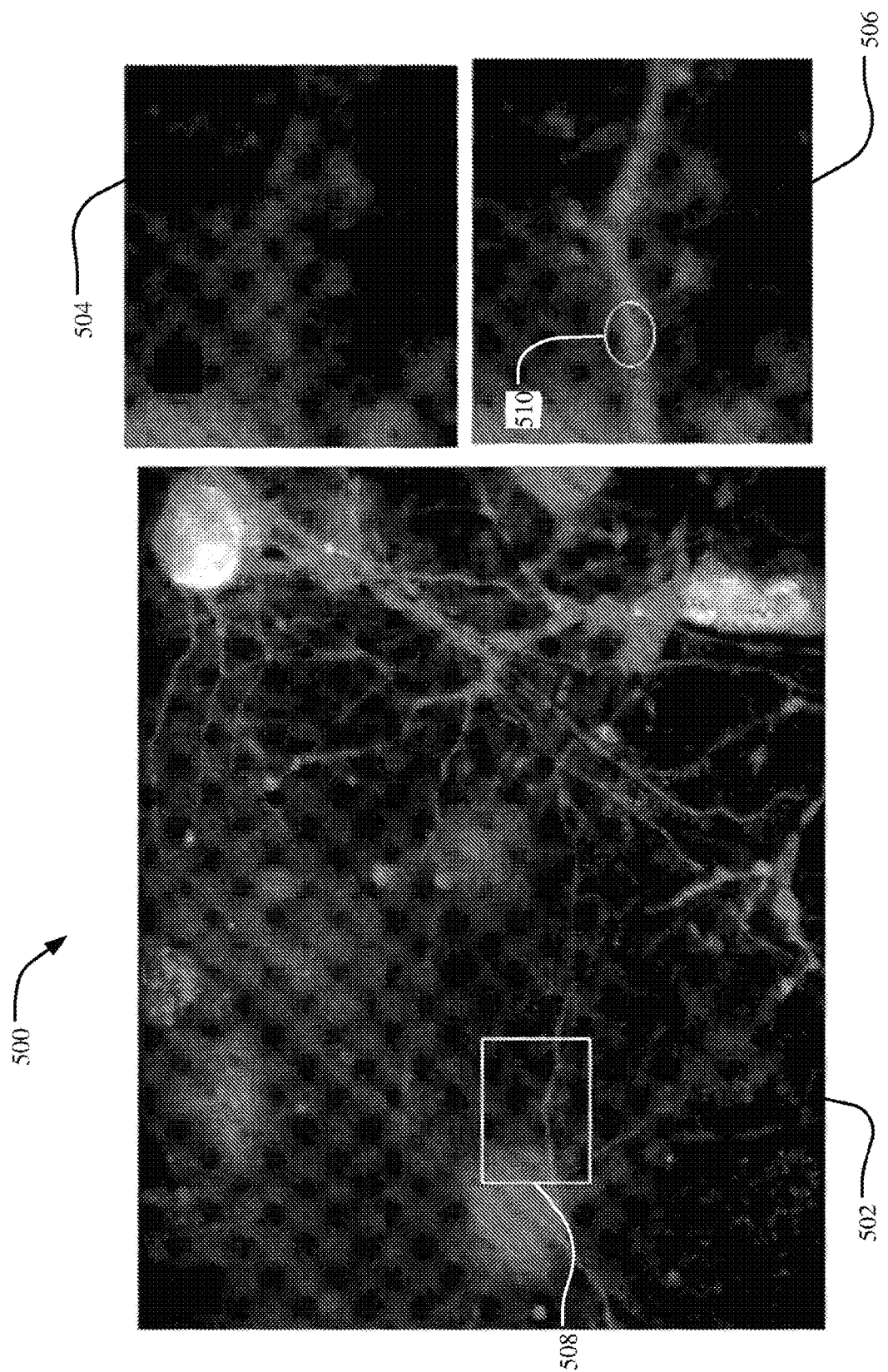
FIG. 7 illustrates an example live projection of cultured cortical neurons, including magnified views at different time points.
Figure 8:
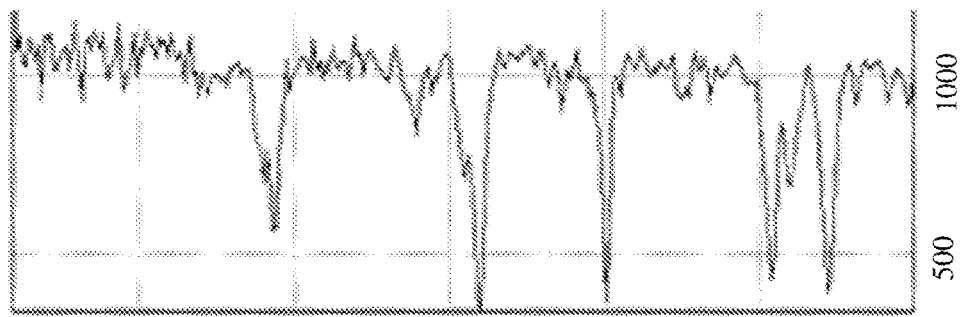
FIG. 8 shows a signal trace from a region shown in one of the magnified views of FIG. 7.
Figure 8:

As described herein, the system 100 may be used for rapid projection imaging. As an example 400 of such rapid projection imaging, turning to FIG. 6, images 402-404 show blebs on another MV3 cell labeled with AKtPH-GFP, and images 406 and 408 are kymographs taken along the lines 410-412, respectively. As another example 500, referring to FIG. 7, a time series of calcium waves in primary cardiomyocytes and neurons are acquired. Image 502 shows a live projection of cultured cortical neurons expressing calcium indicator GCaMP6f, with images 504 and 506 being a magnification of the region 508 of the image 502 at two different time points. FIG. 8 shows a signal trace 600 from the region 510 of the image 506. As can be understood from the example 500, the ability to image volume projections directly using the present technology permits observation of calcium waves propagating through dendritic arbors that otherwise would likely have been lost if the same volume had been acquired through the serial acquisition of image planes that are computationally sheared.

Figure 9:
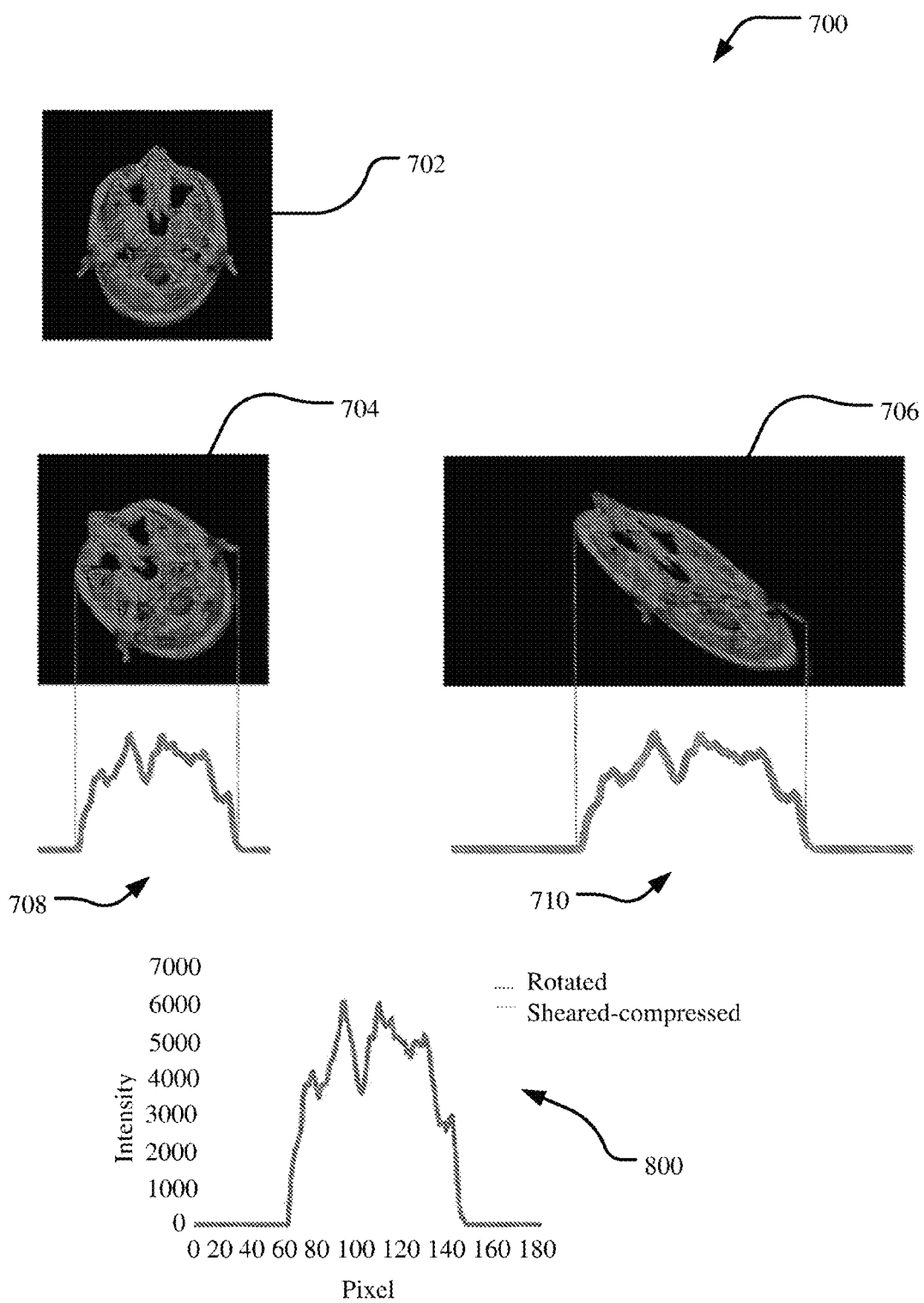
FIG. 9 illustrates a comparison between a projection from a sheared image and a projection from a rotated image.

Referring to FIG. 9, equivalence between a projection from a rotated volume and a sheared volume is illustrated. In an example 700, an original 2D image 702 is shown. A rotated image 704 is a numerical simulation of a rotation of the original 2D image 702. A subsequent sum projection 708 of the rotated image 704 is shown. A sheared image 706, in comparison, is a numerical shearing of the original 2D image 702, and a subsequent sum projection 710 of the sheared image 706 is shown. A graph 712 comparing the sum projections 708 and 710 is shown. To compare the line profiles of the sum projections 708-710, the sum projection 710 was compressed to a same length as the sum projection 708. As shown in the graph 800, the sum projections 708-710 are largely indistinguishable with any small differences likely to have arisen from numerical errors associated with the shearing and rotation.

In one implementation, where a magnitude of shearing is varied for each projected image, a visual impression is generated that the sample 102 is being viewed from different perspectives. For LLSM and OPM applications, the shearing unit 114 performs shearing such that the lateral displacement occurring during the scanning process of the system 100 is undone. As such, the resulting projection is generally equivalent to the numerically sheared and projected 3D data coming from the system 100. However, in some implementations, the shearing unit 114 may perform a larger or smaller shearing angle than that driven by the system 100. As such, the system 100 provides shearing by an arbitrary angle and subsequent projection.

The shearing unit 114 of a live projection module may easily augment existing LLSM and OPM imaging systems. The system is compact shearing unit 114 is compact, introduces negligible light-losses (i.e., <1%), and is fully compatible with normal microscope operation by simply switching it off In implementations where axial information can be discarded, the system 100 allows for high-contrast and high-resolution sum projection imaging that is N-fold faster than a traditional light-sheet microscope, where N is the number of Z-slices to acquire a 3D image stack. Despite sacrificing the spatial information in one dimension, such projection imaging of the system 100 may be useful in fields, such as neuroscience, involving rapid imaging of large volumes to resolve coordinated activity of neuronal circuits.

Generally, the system 100 acquires a 3D stack where each image is shifted laterally, such that the volume may be directly viewed as raw data. This live projection of the imaging volume may be obtained from one or more z-scans being synchronized with optical shearing during an exposure of a single frame of the camera 120. The live projection imaging may be used to explore cellular 3D morphologies and dynamics, with optimization of imaging parameters, such as light-sheet position and focus being readily adjustable during the live projection. The presently disclosed technology is able to explore such morphologies, dynamics, and fast biological processes as it is faster by a factor equaling the number of z-slices within a sequentially acquired stack. Additionally, the presently disclosed technology is simple to implement as the shearing unit 114 is a compact unit that attaches to the camera 120, such that user experience and volumetric imaging capabilities are concurrently improved.

Figure 10:
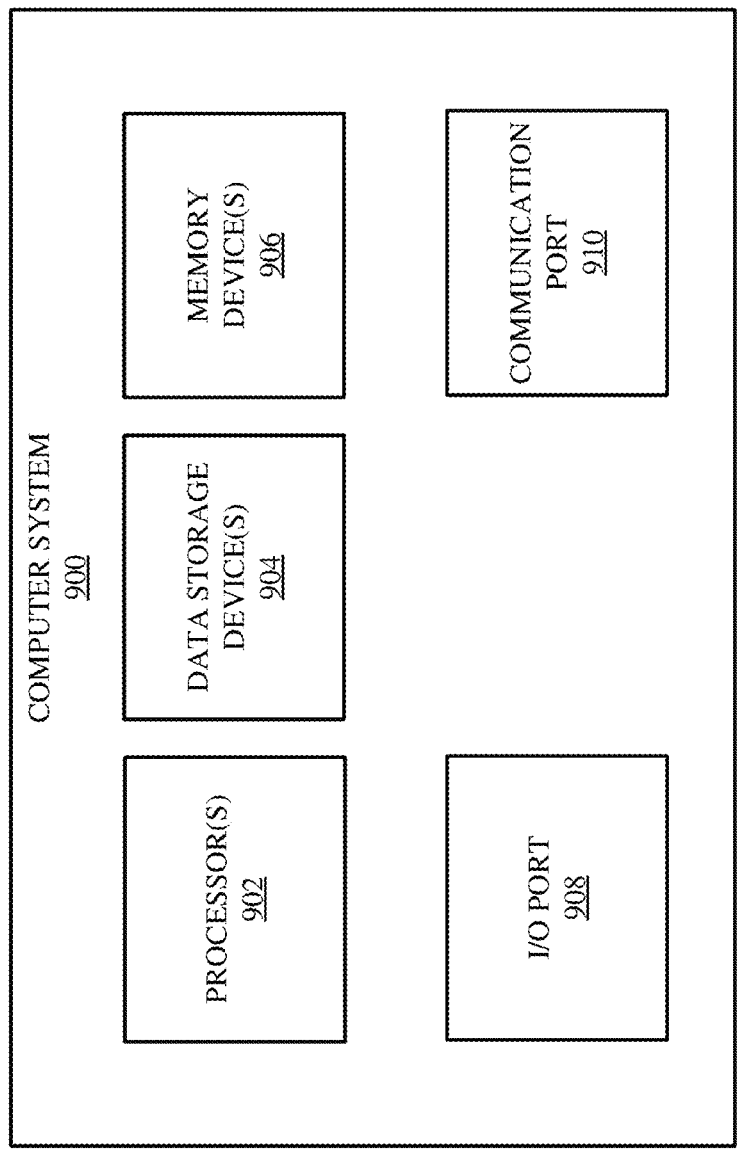
FIG. 10 is an example computing system that may implement various systems and methods discussed herein.

Referring to FIG. 10, a detailed description of an example computing system 900 having one or more computing units that may implement various systems and methods discussed herein is provided. The computing system 900 may be applicable to the system 100 and/or other computing or network devices for imaging, analysis, and exploration of samples. It will be appreciated that specific implementations of these devices may be of differing possible specific computing architectures not all of which are specifically discussed herein but will be understood by those of ordinary skill in the art.

The computer system 900 may be a computing system is capable of executing a computer program product to execute a computer process. Data and program files may be input to the computer system 900, which reads the files and executes the programs therein. Some of the elements of the computer system 900 are shown in FIG. 10, including one or more hardware processors 902, one or more data storage devices 904, one or more memory devices 908, and/or one or more ports 908-910. Additionally, other elements that will be recognized by those skilled in the art may be included in the computing system 900 but are not explicitly depicted in FIG. 10 or discussed further herein. Various elements of the computer system 900 may communicate with one another by way of one or more communication buses, point-to-point communication paths, or other communication means not explicitly depicted in FIG. 10.

The processor 902 may include, for example, a central processing unit (CPU), a microprocessor, a microcontroller, a digital signal processor (DSP), and/or one or more internal levels of cache. There may be one or more processors 902, such that the processor 902 comprises a single central-processing unit, or a plurality of processing units capable of executing instructions and performing operations in parallel with each other, commonly referred to as a parallel processing environment.

The computer system 900 may be a conventional computer, a distributed computer, or any other type of computer, such as one or more external computers made available via a cloud computing architecture. The presently described technology is optionally implemented in software stored on the data stored device(s) 904, stored on the memory device (s) 906, and/or communicated via one or more of the ports 908-910, thereby transforming the computer system 900 in FIG. 10 to a special purpose machine for implementing the operations described herein. Examples of the computer system 900 include personal computers, terminals, workstations, mobile phones, tablets, laptops, personal computers, multimedia consoles, gaming consoles, set top boxes, and the like.

The one or more data storage devices 904 may include any non-volatile data storage device capable of storing data generated or employed within the computing system 900, such as computer executable instructions for performing a computer process, which may include instructions of both application programs and an operating system (OS) that manages the various components of the computing system 900. The data storage devices 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 906 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 904 and/or the memory devices 906, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 900 includes one or more ports, such as an input/output (I/O) port 908 and a communication port 910, for communicating with other computing, network, or vehicle devices. It will be appreciated that the ports 908-910 may be combined or separate and that more or fewer ports may be included in the computer system 900.

The I/O port 908 may be connected to an I/O device, or other device, by which information is input to or output from the computing system 900. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 900 via the I/O port 908. Similarly, the output devices may convert electrical signals received from computing system 900 via the I/O port 908 into signals that may be sensed as output by a human, such as sound, light, and/or touch. The input device may be an alphanumeric input device, including alphanumeric and other keys for communicating information and/or command selections to the processor 902 via the I/O port 908. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like.

In some implementations, the input device and the output device may be the same device, for example, in the case of a touchscreen.

The environment transducer devices convert one form of energy or signal into another for input into or output from the computing system 900 via the I/O port 908. For example, an electrical signal generated within the computing system 900 may be converted to another type of signal, and/or vice-versa. In one implementation, the environment transducer devices sense characteristics or aspects of an environment local to or remote from the computing device 900, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 900, such as, physical movement of some object (e.g., a mechanical actuator), heating or cooling of a substance, adding a chemical substance, and/or the like.

In one implementation, a communication port 910 is connected to a network by way of which the computer system 900 may receive network data useful in executing the methods and systems set out herein as well as transmitting information and network configuration changes determined thereby. Stated differently, the communication port 910 connects the computer system 900 to one or more communication interface devices configured to transmit and/or receive information between the computing system 900 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 910 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 910 may communicate with an antenna or other link for electromagnetic signal transmission and/or reception.

In an example implementation, images, image data, and software and other modules and services may be embodied by instructions stored on the data storage devices 904 and/or the memory devices 906 and executed by the processor 902.

The system set forth in FIG. 10 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for imaging a sample using a microscopy system, the method comprising:
   scanning the sample along a scanning direction while illuminating the sample with light generated by at least one light source along an illuminating direction;
   shearing fluorescence light emitted by the sample in response to illumination of the sample, the fluorescence light sheared optically using a shearing unit to form a plurality of sheared volume image planes which create a sheared volume; and
   projecting an individual sheared volume image plane of the plurality of sheared volume image planes onto a single camera frame of an imager to permit viewing in real time using the shearing unit.

2. The method of claim 1, wherein the shearing unit includes a first mirror and a second mirror of a modular galvanometer.

3. The method of claim 2, further comprising:
   displacing the fluorescence light in a displacement direction across the imager by rotating the first mirror and the second mirror in synchrony when the sample is scanned.

4. The method of claim 3, wherein the displacement direction is lateral.

5. The method of claim 2, wherein the modular galvanometer is mounted to the imager.

6. The method of claim 2, wherein the first mirror and the second mirror are made from gold.

7. The method of claim 2, wherein the imager is at least one of a sCMOS camera or a CCD camera.

8. The method of claim 1, wherein the scanning direction is diagonal.

9. The method of claim 1, further comprising:
   providing a direct view of the sheared volume of the sample in real time.

10. The method of claim 9, further comprising:
    adjusting at least one imaging parameter based on the direct view.

11. The method of claim 10, wherein the at least one imaging parameter includes one or more of light-sheet position, focus, beam property, alignment, and scan range.

12. The method of claim 9, wherein the sample includes cells, the direct view including cellular 3D morphologies and dynamics of the cells.

13. The method of claim 9, wherein the direct view includes a visual impression that the sample is being viewed from different angles, the visual impression generated by varying a magnitude of shearing for the sheared volume being projected.

14. The method of claim 1, wherein the microscopy system is a lattice light-sheet microscopy system.

15. The method of claim 1, wherein the microscopy system is an oblique plane microscopy system.

16. The method of claim 1, wherein the microscopy system is an epifluorescence microscopy system.

17. The method of claim 1, wherein a summation is formed by scanning the sample one or more times during exposure of the single camera frame.

18. The method of claim 1, wherein projecting the sheared volume includes generating a sum projection by numerically summing image tiles associated with the sheared volume.

19. The method of claim 1, wherein a speed at which the sheared volume is projected is tied to a frame rate of the imager.

20. The method of claim 1, wherein the fluorescence light is directed through a tube lens into the shearing unit, or the fluorescence light is sheared synchronously with acquisition by the imager.

* * * * *